(12) United States Patent
Braren et al.

(10) Patent No.: US 11,926,351 B2
(45) Date of Patent: Mar. 12, 2024

(54) APPARATUS AND METHOD FOR WEAR DETECTION OF RAILROAD VEHICLE WHEELS

(71) Applicant: BNSF Railway Company, Fort Worth, TX (US)

(72) Inventors: Hark Braren, Fort Worth, TX (US); Erik Karl Frohberg, Keller, TX (US)

(73) Assignee: BNSF Railway Company, Fort Worth, TX (US)

( * ) Notice: Subject to any disclaimer, the term of this patent is extended or adjusted under 35 U.S.C. 154(b) by 845 days.

(21) Appl. No.: 17/009,297

(22) Filed: Sep. 1, 2020

(65) Prior Publication Data

US 2022/0063685 A1 Mar. 3, 2022

(51) Int. Cl.
| | |
|---|---|
| *B61K 9/12* | (2006.01) |
| *B61L 27/57* | (2022.01) |
| *G01L 5/00* | (2006.01) |
| *G01M 17/10* | (2006.01) |

(52) U.S. Cl.
CPC ............... *B61K 9/12* (2013.01); *B61L 27/57* (2022.01); *G01L 5/0052* (2013.01); *G01M 17/10* (2013.01)

(58) Field of Classification Search
CPC .. B61K 9/08; B61K 9/12; B61L 27/57; G01L 5/0052; G01M 17/10
See application file for complete search history.

(56) References Cited

U.S. PATENT DOCUMENTS

| | | |
|---|---|---|
| 2,574,474 A | 11/1951 | Gieskieng |
| 3,294,969 A | 12/1966 | Sibley |
| 3,718,040 A | 2/1973 | Freeman et al. |
| 6,564,467 B1 | 5/2003 | Kay et al. |
| 7,926,362 B2 | 4/2011 | Andersson et al. |
| 8,006,559 B2 | 8/2011 | Mian et al. |
| 8,305,567 B2 | 11/2012 | Hesser et al. |
| 9,234,786 B2 | 1/2016 | Groll et al. |
| 9,395,276 B2 | 7/2016 | Kristen et al. |
| 9,476,802 B2 | 10/2016 | Sato |
| 10,124,819 B2 | 11/2018 | Ghosh et al. |
| 10,137,915 B2 | 11/2018 | LeFebvre et al. |
| 10,352,831 B2 | 7/2019 | Kondo et al. |
| 10,365,186 B2 | 7/2019 | Ehmke et al. |
| 10,377,397 B2 | 8/2019 | Kelley |
| 10,543,859 B2 | 1/2020 | Gomes et al. |
| 2016/0031458 A1 | 2/2016 | Giraldo et al. |

(Continued)

FOREIGN PATENT DOCUMENTS

| | | | |
|---|---|---|---|
| CN | 2807221 Y | * 8/2006 | ............ G01G 19/04 |
| CN | 202403785 U | 8/2012 | |
| CN | 107389169 A | 11/2017 | |

(Continued)

*Primary Examiner* — Robert J McCarry, Jr.
(74) *Attorney, Agent, or Firm* — Whitaker Chalk Swindle & Schwartz, PLLC; Enrique Sanchez, Jr.

(57) ABSTRACT

A railroad wheel impact load detection test panel includes a secondary instrumentation rail proximate a field side of a primary or running rail of a section of railroad track, and elevated a prescribed distance so that the wheels of a rail car traverse the instrumentation rail within the test panel. The instrumentation rail includes an optical strain gauge to sense the wheel impact load. The sensed impact data is correlated with wheel damage signatures to identify wheels to be restored or replaced before failure occurs.

16 Claims, 8 Drawing Sheets

(56) References Cited

U.S. PATENT DOCUMENTS

2016/0159378 A1  6/2016  Shi et al.
2020/0055531 A1  2/2020  Mesher

FOREIGN PATENT DOCUMENTS

| DE | 10241320 A1 | 3/2004 |
|---|---|---|
| DE | 202006016902 U1 | 3/2007 |
| JP | S50156113 A | 12/1975 |
| JP | S51113752 A | 10/1976 |
| JP | H05281100 A | 10/1993 |
| JP | 1999083605 A | 3/1999 |
| JP | 2005331263 A | 12/2005 |
| KR | 100666588 B1 | 1/2007 |
| KR | 101247377 B1 | 3/2013 |
| WO | 1992000214 A1 | 1/1992 |
| WO | 2011029526 A1 | 3/2011 |

* cited by examiner

APPARATUS AND METHOD FOR WEAR DETECTION OF RAILROAD VEHICLE WHEELS

TECHNICAL FIELD

The present disclosure concerns the safety of railroad rolling stock and more particularly the detection of defects on the tread surface of wheels of railroad vehicles that occur due to, over-loading, thermal effects, debris and foreign objects, sudden braking, and the like.

BACKGROUND

Railroad rolling stock—railroad cars and locomotives—are supported by and roll along a pair of parallel rails on steel wheels. Each wheel includes a flange integral with the inside edge of the wheel. The flange, of larger diameter than the running circumference of the wheel, extends downward next to the inside edge of its proximate rail. The wheel treads are tapered to maintain wheel to rail contact. Thus, the wheel flanges on both sides of the car or locomotive can assist in the alignment of the wheels, and the car or locomotive, with the railroad track, on both straight and curved roadways. The wheels are subject to heavy loads, bearing most of the weight on the running surface or tread of the wheel between the flange and the outermost side—the "field" side—of the wheel.

Because of the very heavy loads carried by the rolling stock, the wheels are subject to wear and damage. Various kinds of wear include abrasions and indentations, surface and subsurface fatigue, cracks due to thermal or impact damage, flat spots, and wear due to sliding friction as the wheel moves sideways from motion of the car around curves or due to vibration and the like. Such damage to the wheels, if left undetected can lead to wheel failure, broken wheels, failure of the wheel-supporting structure called a "truck," and, in the worst instance, derailment of the railroad vehicle. Occasionally, derailments can occur due to in-service wheel failures, sometimes catastrophic in nature, which can result in high economic loss to the rolling stock and its contents, serious damage to the property where the derailment occurred. The consequences of railroad derailment are severe.

The standard test protocol for measuring wheel defects such as abnormal wear, cracks, or broken wheels is called Wheel Impact Load Detection or "WILD." Conventional WILD processes include various methods of detecting damage and wear during operation of the rolling stock. One type measures the load on the running rails aligned with the tread surface of the rail. Another type uses cameras to obtain visual images of potential defects for later inspection. A third type uses accelerometers to measure vibration associated with cracked wheels. These systems are characterized by limitations in their ability to detect and measure both surface and subsurface defects, by the complexity of using and interpreting the measurements, by high false readings, either negative or positive, and an inability to reliably detect potentially dangerous defects. Railroad train derailments caused by broken wheels are among the most catastrophic, from an equipment cause standpoint, and costly accidents involving trains. As an illustration of these shortcomings, a recent industry study found that more than 70% of broken wheels on freight cars contained defects that were not detected by the WILD methods before the wheels failed, on freight car wheel loads up to 80 kips. 80 kips is equal to 80,000 lb. of force. Moreover, the conventional WILD methods do not measure the impact loads in the region of the wheel tread surface where most of the defects that cause failure occur—that portion of the wheel tread surface away from the flange and near the field side of the tread.

What is needed to overcome these deficiencies is a method of testing railroad car and locomotive wheels that detects and isolates wheel defects under heavy loads before such defect seriously degrades the wheel's ability to safely bear the loading it is subject to.

SUMMARY

In one embodiment the present disclosure, a railroad wheel impact load detection test panel can comprise a section of a railroad track having first and second primary rails; a first secondary rail and a second secondary rail, each having a first end and a second end and disposed proximate a field side of each primary rail of the railroad track such that its running surface is elevated by a predetermined increment relative to the running surface of the primary rail; and a sensor disposed on the bottom surface of each secondary rail at a predetermined location; wherein the secondary rail includes an elevation transition ramp disposed at each first and second end thereof.

In one aspect, each first and second secondary rail can comprise a predetermined length of rail supported proximate each primary rail such that its running surface is disposed by an elevation of 0.250 to 0.500 inches above the elevation of the proximate primary rail; and each first and second end of each secondary rail is tapered downward such that the elevation at each first and second end thereof is equal to the elevation of the proximate primary rail; wherein the predetermined length of the first and second secondary rails is at least 80 feet, the elevation transition ramp has a slope within one part in twenty to one part in two hundred, and the elevation of each secondary rail is approximately 0.375 inch.

In another aspect, the sensor can comprise an optical strain gauge having a fiber optic sensing element housed in a weather-resistant container, strain gauges welded to the rail, load cells, load sensors, or other suitable sensor; and an integral connector for coupling the optical strain gauge to external instrumentation; wherein the sensing element has a sensitivity corresponding to a resolution of no greater than a one thousand pound (one kip) load on the first and second secondary rails. The external instrumentation comprises a housing supported on a tower along a wayside of the railroad track; a processing system enclosed in the housing and connected through a cable to the integral connector; wherein the processing system is controlled by program software stored in non-volatile memory coupled to the processing system.

In another aspect, the sensor can provide an output comprising a distinctive signature of wheel tread defects indicating one or more of rim breakage, surface or subsurface fatigue, tread cracks, wheel flats, tread indentations, and sliding wear.

In another embodiment, a railroad wheel impact load detection test panel can comprise a section of a railroad track having first and second primary rails; at least one secondary rail, having a first end and a second end and disposed proximate a field side of either primary rail of the railroad track such that its running surface is elevated by a predetermined increment relative to the running surface of the primary rail; and a sensor disposed on the bottom surface of the at least one secondary rail at a predetermined location; wherein the at least one secondary rail includes an elevation transition ramp disposed at each first and second end thereof.

In one aspect, the at least one secondary rail can comprise a predetermined length of rail supported proximate each primary rail such that its running surface is disposed by an elevation of 0.250 to 0.500 inches above the elevation of the proximate primary rail; and each first and second end of the at least one secondary rail is tapered downward such that the elevation at each first and second end thereof is equal to the elevation of the proximate primary rail; wherein the predetermined length of the at least one secondary rail is at least 80 feet, the elevation transition ramp has a slope within one part in twenty to one part in two hundred, and the elevation of each secondary rail is approximately 0.375 inch.

In another aspect, the load sensor can comprise an optical strain gauge having a fiber optic sensing element housed in a weather-resistant container; and an integral connector for coupling the optical strain gauge to external instrumentation; wherein the sensing element has a sensitivity corresponding to a resolution of no greater than a one thousand pound (one kip) load on the at least one secondary rail. The external instrumentation comprises a housing supported on a tower along a wayside of the railroad track; a processing system enclosed in the housing and connected through a cable to the integral connector; wherein the processing system is controlled by program software stored in non-volatile memory coupled to the processing system.

In another aspect, the load sensor can provide an output comprising a distinctive signature of wheel tread defects indicating one or more of rim breakage, surface or subsurface fatigue, tread cracks, wheel flats, tread indentations, and sliding wear. In another exemplary embodiment, the wheels' condition can be based on individual wheel measures, their side to side delta and that delta's magnitude, in terms of it being an outlier in the train.

DETAILED DESCRIPTION

Figure 1:
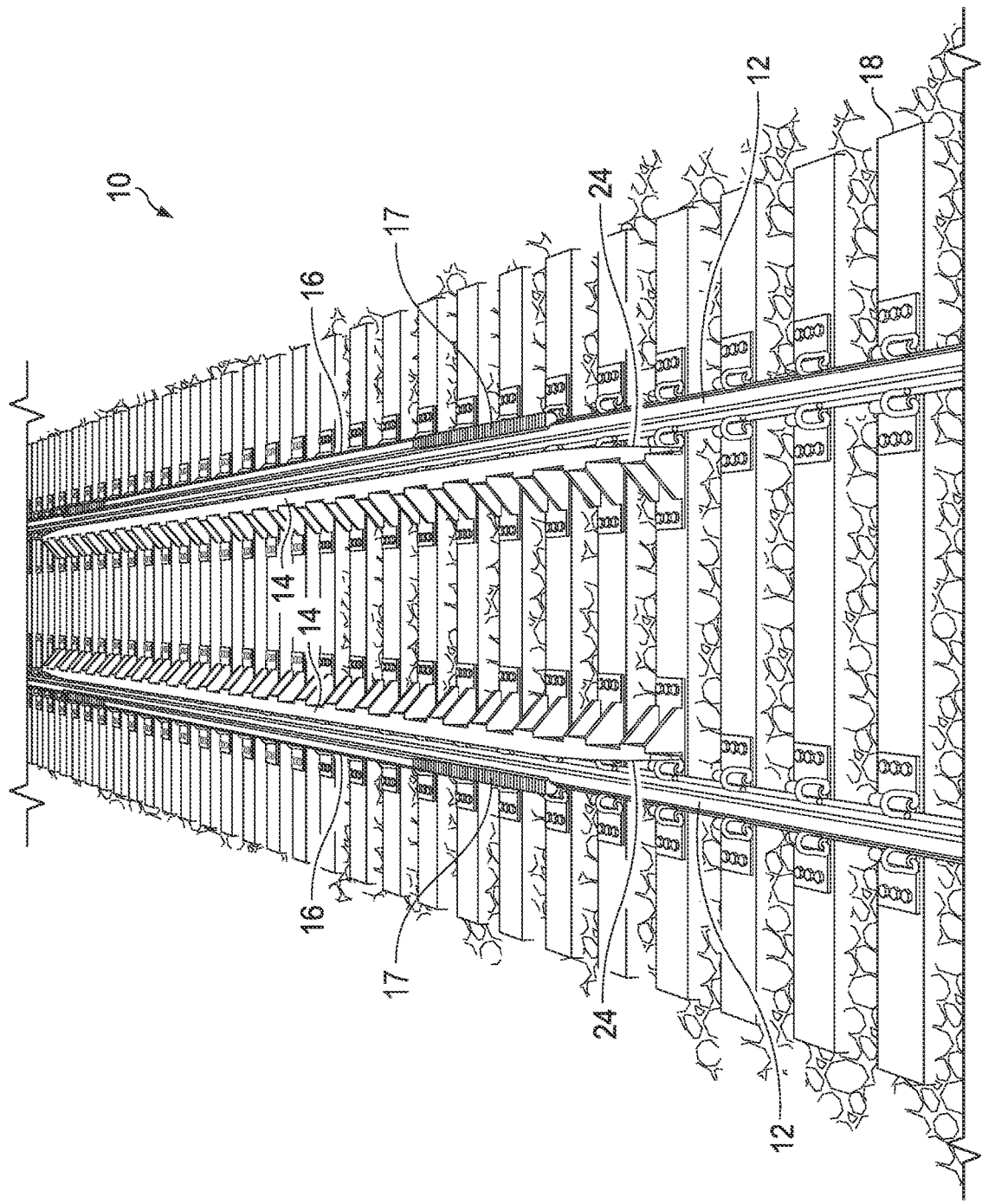
FIG. 1 is an end view of a railroad track test panel, in accordance with one or more exemplary embodiments of the present disclosure.

Accordingly there is disclosed herein an advancement in the state of the art for detecting broken wheels and other wheel defects of railroad rolling stock using a modified track panel—a section of railroad track configured as a test panel. The railroad track, as is well-known, includes a pair of parallel primary rails, usually fabricated of steel and spaced a prescribed gauge distance apart, and supported on a ballast structure constructed on the Earth's surface. The ballast structure may include, for example a continuous series of elongated, closely-spaced ties—members disposed under and perpendicular to the first and second rails—spaced at uniform intervals and supported on a composition bed of stone or rock aggregate disposed along the railroad right of way. The aggregate may be overlayed on a subgrade formed to support the heavy loads of a railroad train.

According to the present disclosure, a railroad wheel impact load detection ("WILD") test panel includes a secondary instrumentation rail proximate a field side of a primary or running rail of a section of railroad track, and elevated a prescribed distance so that the wheels of a rail car traverse the instrumentation rail within the test panel. The instrumentation rail includes an optical strain gauge to sense the wheel impact load. The sensed impact data is correlated with wheel damage signatures to identify wheels to be restored or replaced before failure occurs.

Briefly stated, the disclosure provides for the construction of the test panel on a selected portion of a railroad track disposed along a railroad right of way. To the selected portion of primary rails is added, on the outside or field side of each primary rail, a secondary instrument rail proximate each primary rail. In one embodiment the length of each secondary instrument rail may be a predetermined value that should exceed the length of the longest rail car that will be tested on the test panel. The running surface of each secondary rail is elevated by a predetermined increment relative to the running surface of the primary rails, and the secondary rail includes an elevation transition ramp disposed at each first and second end thereof. A sensitive, an optical strain gauge or other suitable sensor, such as a fiber optic sensor can be attached to the underside of each secondary or instrument rail, between the rail and the cross tie supporting the primary and secondary rails. The sensitivity of the sensor should be able to resolve a wheel load increment of a one kip (one thousand pound) load.

The sensor can detects the edge of tread impact as the wheels of a railroad vehicle roll over the instrument rail of the test panel at a prescribed speed while bearing its rated load. The sensor can be fiber optic, mechanical, electrical, electromechanical, or other suitable sensor type. The sensor and its associated instrumentation receives, interprets, and records the edge of wheel tread impact information to provide the test data. The signals emitted by the sensor, as the rail car rolls along the test panel, are sensitive to the different kinds of wear that railroad wheels develop. The wear patterns, as illustrated in FIGS. 7A-7F, produce distinctive signals that may be received in the instrumentation modules 62, 64, 66, interpreted by the instrumentation in the substation 80, and collected to enable scheduling of required service to the wheel sets identified by the test panel. The test panel may be configured to measure the edge of tread impact on both left and right side wheels of a wheelset of a railroad car truck assembly.

The test data provided by the test panel may be correlated with the particular vehicle and each particular wheel according to coded information, called the Automatic Equipment Identification ("AEI"). The AEI information code is stated as a Railroad Reporting Mark attached to each rail car. The mark includes a two-to-four letter code identifying the owner of the rail car and a numeric code that identifies the car number. The marks may be read by trackside AEI readers, typically using an RFID technology as one example. In some systems the test data output from the instrumentation can be transmitted to a remote location and observed in real time.

A railroad wheel is generally cast or forged of steel, heat treated, and machined on a lathe to a specified profile and dimensions. Some wheels are fitted with steel tires that may be replaced to restore the tread portion of a wheel to specification. Each wheel includes an integral flange of a larger diameter than the rest of the wheel. The flange is disposed on the inside surface of the wheel to keep the wheel aligned with the rail. A wheelset is formed by attaching a wheel on each end of an axle, with the flanged sides facing each other. The wheelset is supported in a truck, an assembly of two wheelsets. The truck is mounted to the underside of a railway car so that it may pivot as the car rounds a curved track.

Figure 2:
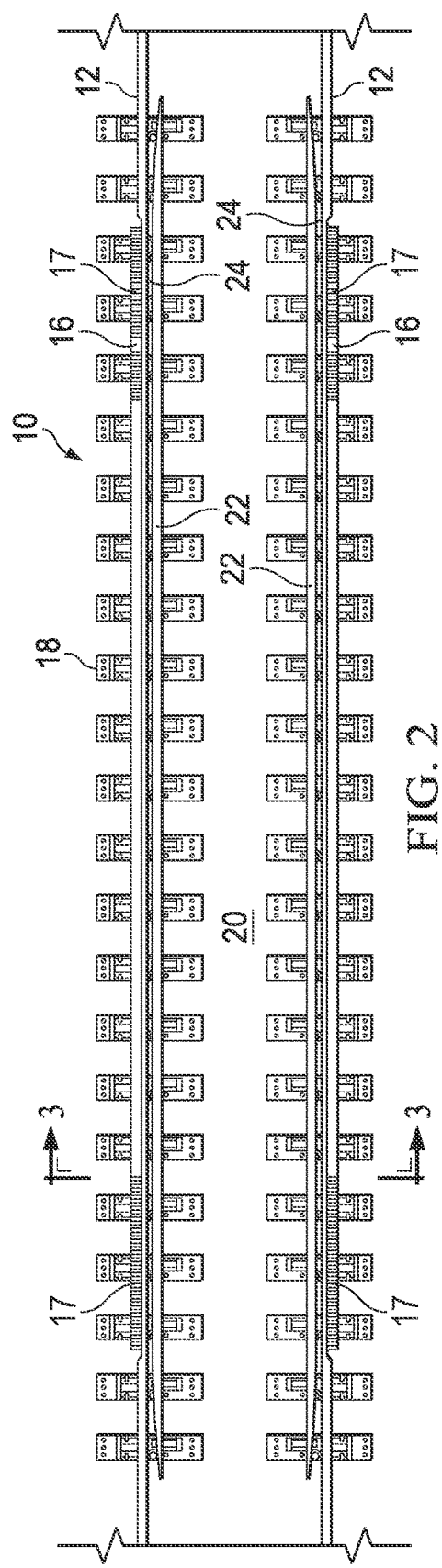
FIG. 2 is a plan view diagram of the test panel of FIG. 1, in accordance with one or more exemplary embodiments of the present disclosure.

FIG. 1 is an end view of a railroad track test panel 10, in accordance with one or more exemplary embodiments of the present disclosure. FIG. 2 is a plan view diagram of the test panel of FIG. 1 and depicts the same structural features shown in FIG. 1.

The track test panel 10 (also called a track panel or a test panel 10 herein), shown in a plan view in FIG. 2, includes a pair of parallel primary or running rails 12, a guard rail 14 disposed proximate the inside edge 16 of each primary rail 12, and a secondary instrument rail 16 disposed closely proximate the outer "field" side of each primary rail 12. The primary rails 12, sometimes called the traffic rails, are the rails that support the train as it rolls along the railway. The rails are supported on ties 18, arranged perpendicular to the rails 12, 14, 16 and spaced at uniform intervals from each other. The ties 18 are preferably supported on a roadbed or ballast 20. The guard rails 14 and the instrument rails 16 are rail segments that extend along the track panel for a distance exceeding the length of the railroad vehicle such as a freight car. A typical freight car is 50 feet to 90 feet long, depending on the type of car (e.g., box car, flat bed car, hopper car, etc.), so the guard rails and instrument rails should exceed that length.

The guard rails 14 are tapered at each end 22 such that the gap 24 between the guard rail 14 and the proximate primary rail 12 increases according to a flare or taper specification expressed as a ratio: 1:D, where D=the length of the tapered section. Thus a taper or other angle of 1:20 describes an angle formed by an ordinate (Y axis) of 1 foot and an abscissa (X axis) of 20 feet. The taper 22 is provided to spread the gap 24 between the guard rail 14 and the primary rail 12 at the ends of the track panel 10 to facilitate alignment of the wheelsets of a railway car as it enters the track panel. The guard rails 14 serve to maintain the flange of the wheels (not shown in this view) in a proper relationship with the instrument rail 16 to ensure repeatability of the sensed impact load measurements made while the test vehicle is rolling on the track panel 10. See FIG. 6 to be described for a cross section view of a wheel disposed on the rails of the track panel 10.

The instrument rails 16 are disposed in close proximity to the field side of the primary rail 12 and elevated by a small prescribed amount as will be described. The instrument rail 16 is elevated slightly relative to the primary rail 12 so that the outer portion of the wheel rolls along the instrument rail 16 instead of the primary rail 12. The small prescribed amount of elevation of the instrument rail may be within the range of 0.250 to 0.500 inches, and preferably 0.375 inch. An elevation transition ramp 17 having a slope within one part in twenty to one part in two hundred is provided to enable a smooth transition of the wheel sets of a railway car as it rolls up to and down from the elevation of the instrument rails 16, i.e., onto and of off the test panel 10. The sole purpose of the instrument rail 16 is to sense the impact load of the wheels as they roll along the rail. The instrument rail 16 is so called because it includes a sensor (to be described) that measures the impact caused by variations in the surface of the wheel tread.

Figure 3:
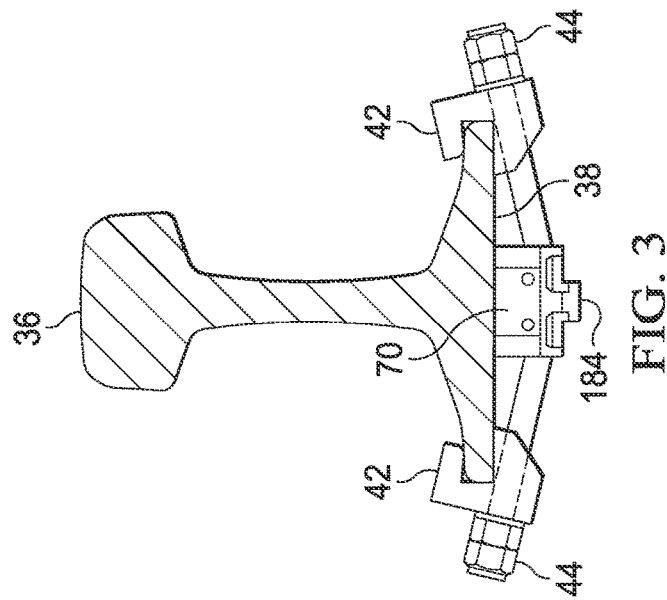
FIG. 3 is an end view detail of a cross section of an instrument rail of the test panel of FIG. 1, in accordance with one or more exemplary embodiments of the present disclosure.
Figure 6:
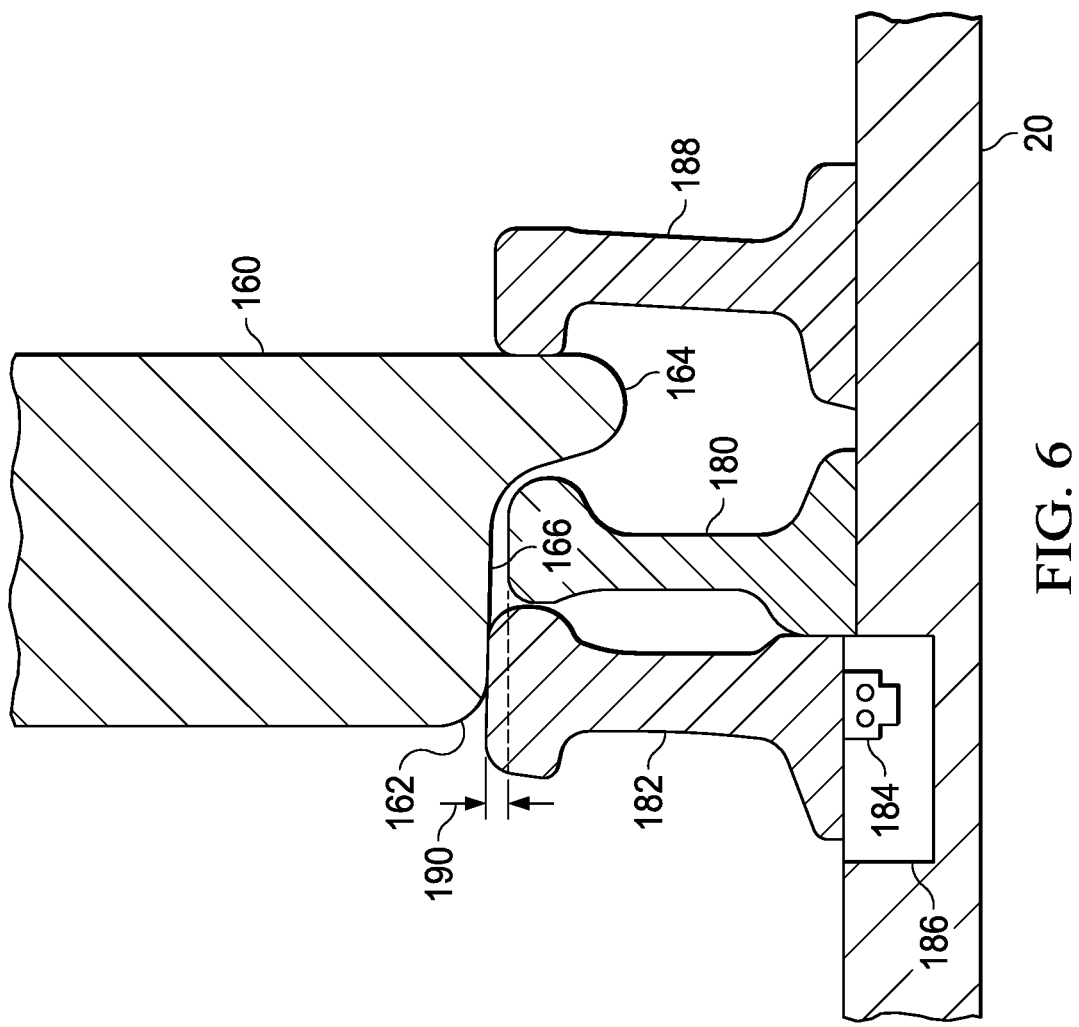
FIG. 6 is a cross section diagram of a railroad wheel and the test rails of the test panel of FIG. 1, in accordance with one or more exemplary embodiments of the present disclosure.

FIG. 3 is an end view detail of a cross section of an instrument rail 16 of the test panel 10 of FIG. 1, in accordance with one or more exemplary embodiments of the present disclosure. The instrument rail 16 is also shown in FIG. 6 as instrument rail 182. The instrument rail 182 includes a running surface 36 and an underside surface 38. Attached to the underside 38 of the instrument rail 182 is an optical strain gauge such as a fiber optic sensor 184. The fiber optic sensor 184 is attached to the underside surface 38 of the instrument rail 182 using a clamp 42 secured by a bolt 44 to each edge of the rail 182. The operation of the sensor 184 is described further in FIG. 6.

Figure 4A:
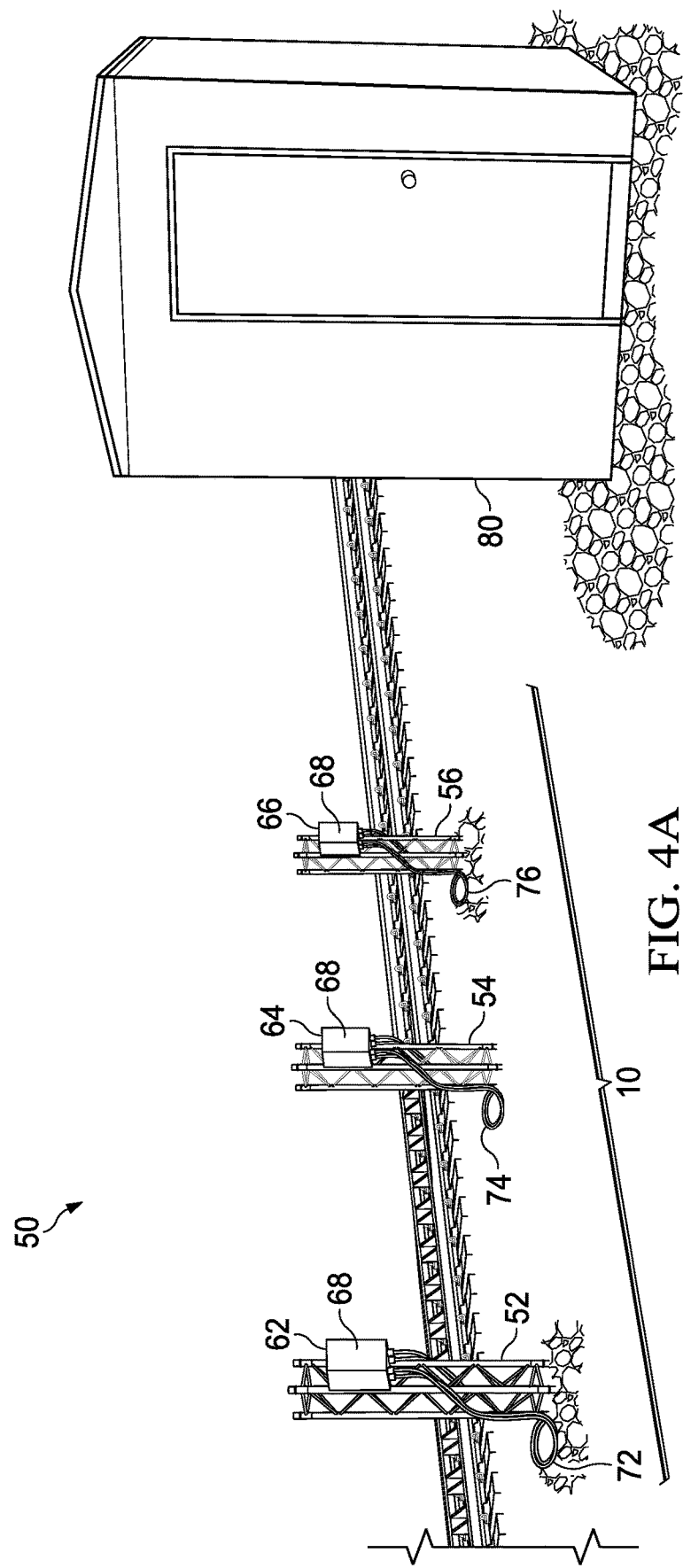
FIG. 4A is a perspective view of the sensor instrumentation installed at the test panel of FIG. 1, in accordance with one or more exemplary embodiments of the present disclosure.
Figure 4B:
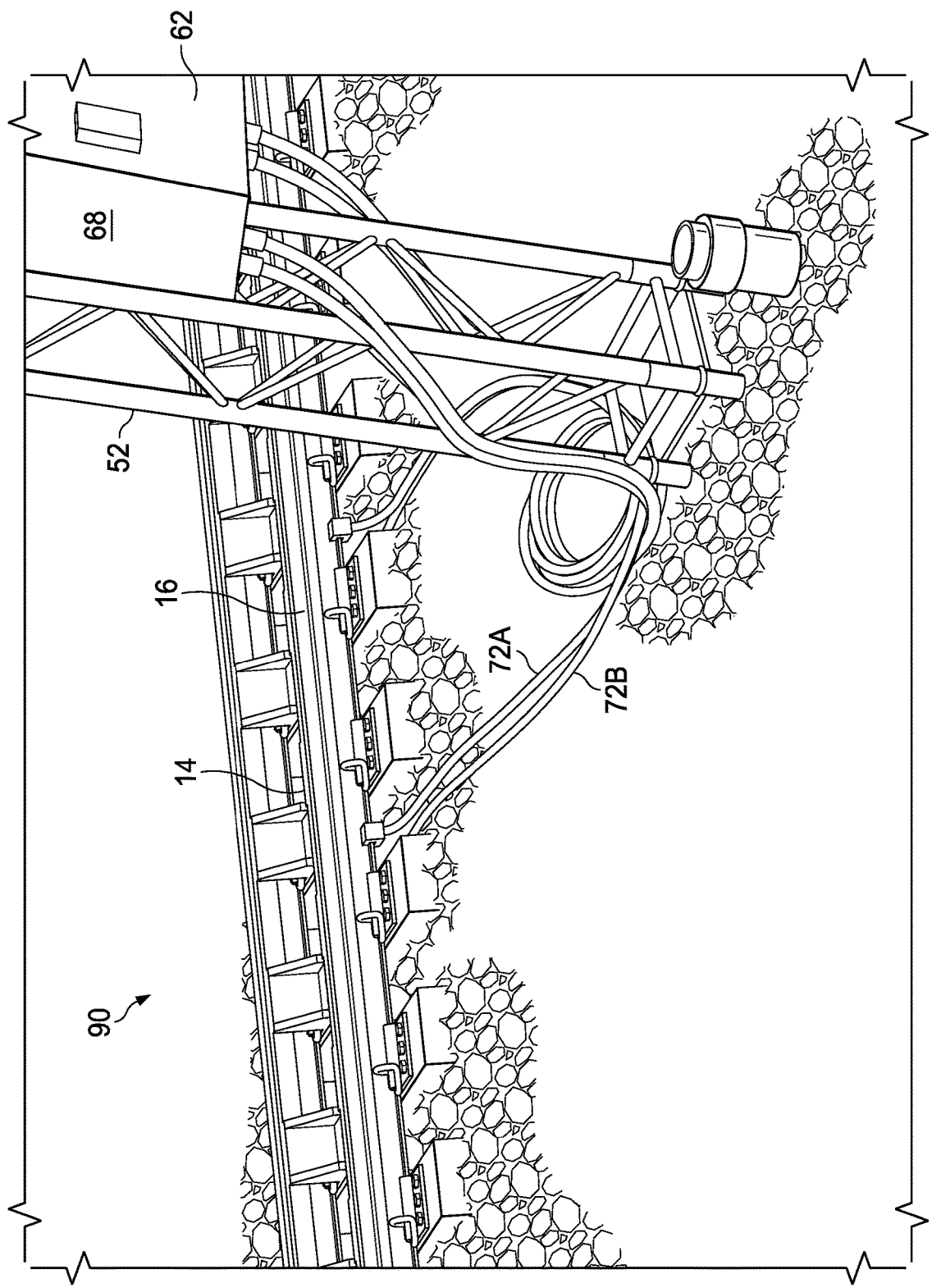
FIG. 4B is a close up perspective view of the sensor instrumentation installed at the test panel of FIG. 1, in accordance with one or more exemplary embodiments of the present disclosure.
Figure 4C:
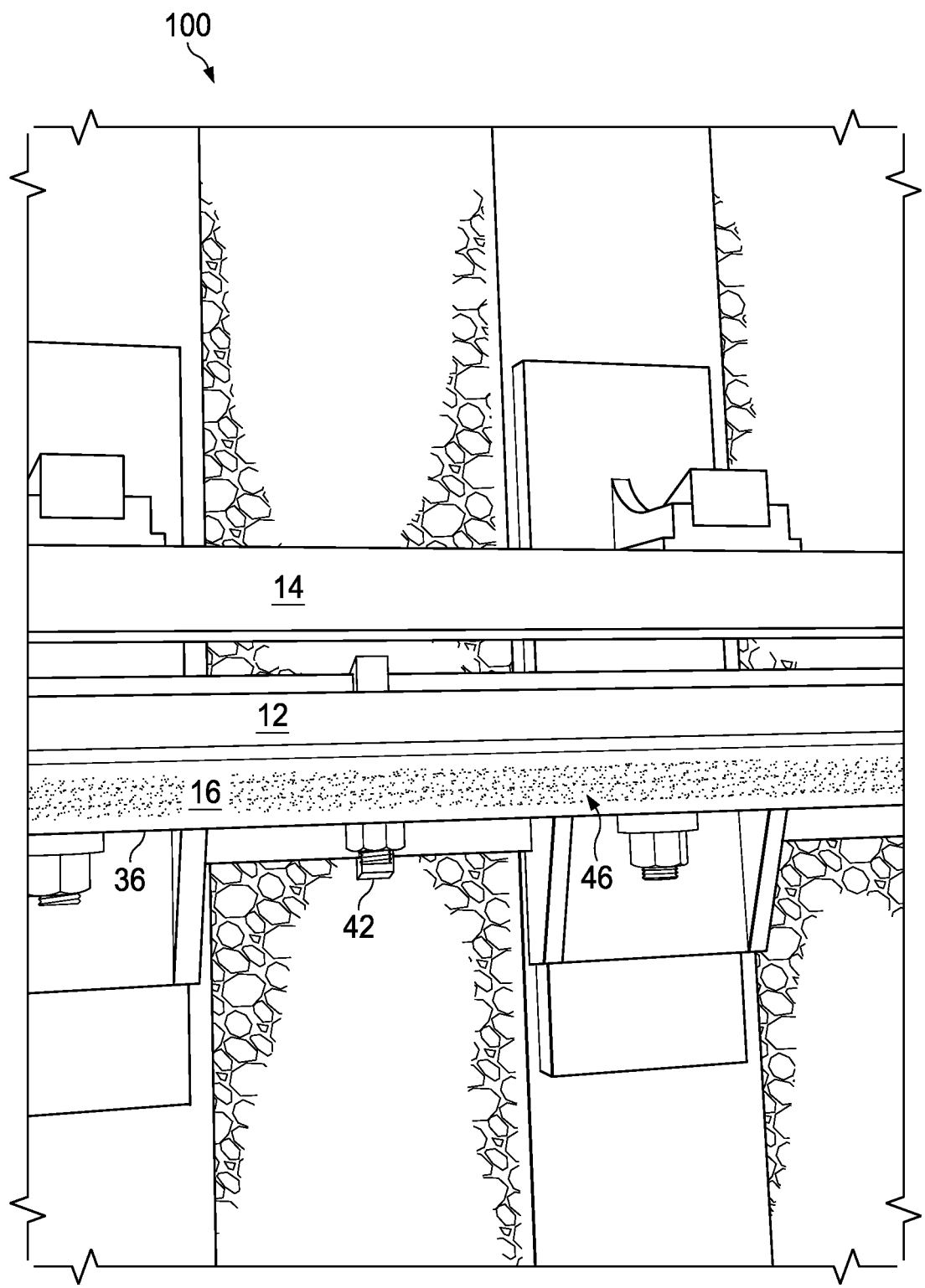
FIG. 4C is a plan view of the sensor installed beneath an instrument rail at the test panel of FIG. 1, in accordance with one or more exemplary embodiments of the present disclosure.

FIGS. 4A through 4C depict views of the instrumentation portions of the track panel 10 in a railroad yard setting.

FIG. 4A is a perspective view of the wayside 50 that includes the sensor instrumentation installed at the test panel 10 of FIG. 1, in accordance with one or more exemplary embodiments of the present disclosure. The instrumentation at the wayside 50 includes three towers 52, 54, and 56 spaced a prescribed distance from the test panel 10. Each tower 52, 54, and 56 provides support for respective instrument modules 62, 64, and 66. A cable is connected from each fiber optic sensor 184 (not shown in the view in FIG. 4A) attached to an instrument rail 182 in the test panel 10 to a respective instrument module 62, 64, and 66. The cables 72, 74, and 76 conduct the detected impact load signals from a fiber optic sensor 182 to instrumentation circuits within the instrument modules 52, 54, and 56. The wayside 50, includes a substation 80, which may be housed in an enclosed structure. The substation may receive data processed in the instrument modules 62, 64, 66 for analysis and format the data for communication to a central location such as a railyard control facility (not shown). The communication from the Instrument modules 62, 64, and 66 to the substation 80 may be through a wired or wireless RF transmission. Similarly, the substation 80 may transmit the results of its analysis operations wirelessly to the railyard control facility.

FIG. 4B is a close up perspective view of the sensor instrumentation installed at the test panel 10 at the wayside 50 of FIG. 4A, in accordance with one or more exemplary embodiments of the present disclosure. In the depicted section 90 of the wayside 50 are the running rail 12, the guard rail 14 and the instrument rail 16 of the near side of the railway test panel 10. Also shown are the instrumentation components for one of the fiber optic sensors including a tower 52, an instrumentation module 62, and a pair of cables 72, one connected to a fiber optic sensor attached to the underside of both instrument rails (left and right, on the near 72A and far 72B sides of the railway) of the test panel 10. In the illustrated example, the instrumentation module 62 may include a housing 68 (FIGS. 4A, 4B) that contains a processing system (not shown) which may be operated according to program software stored in a non-volatile memory coupled to the processing system. The processing system is coupled through the cables 72A and 72B to the fiber optic sensor 184 (FIGS. 3, 4A, 4B and 6) at the integral connector 70 (FIG. 3). The housing may be supported on a tower 52 along the wayside 50 of the railroad track. Also shown in FIG. 4B is a canister that may be configured as a removable data device, a data processing module, or a wireless transmitter/receiver, and the like.

FIG. 4C is a close-up plan view 100 of an installation of one sensor 184 (not visible in the figure, but refer to FIG. 3) installed beneath an instrument rail 16 at the test panel 10 of FIG. 4A, in accordance with one or more exemplary embodiments of the present disclosure. This view includes the running rail 12, the guard rail 14, and the instrument rail 16. On the instrument rail 16 is shown the surface 36 upon which a railroad wheel 160 rolls during a wheel impact load test event to detect conditions of wear on the wheel 160. The shaded area in FIG. 4C depicts surface wear on the instrument rail 16. The fiber optic sensor is secured by the bolts 42.

Figure 5:
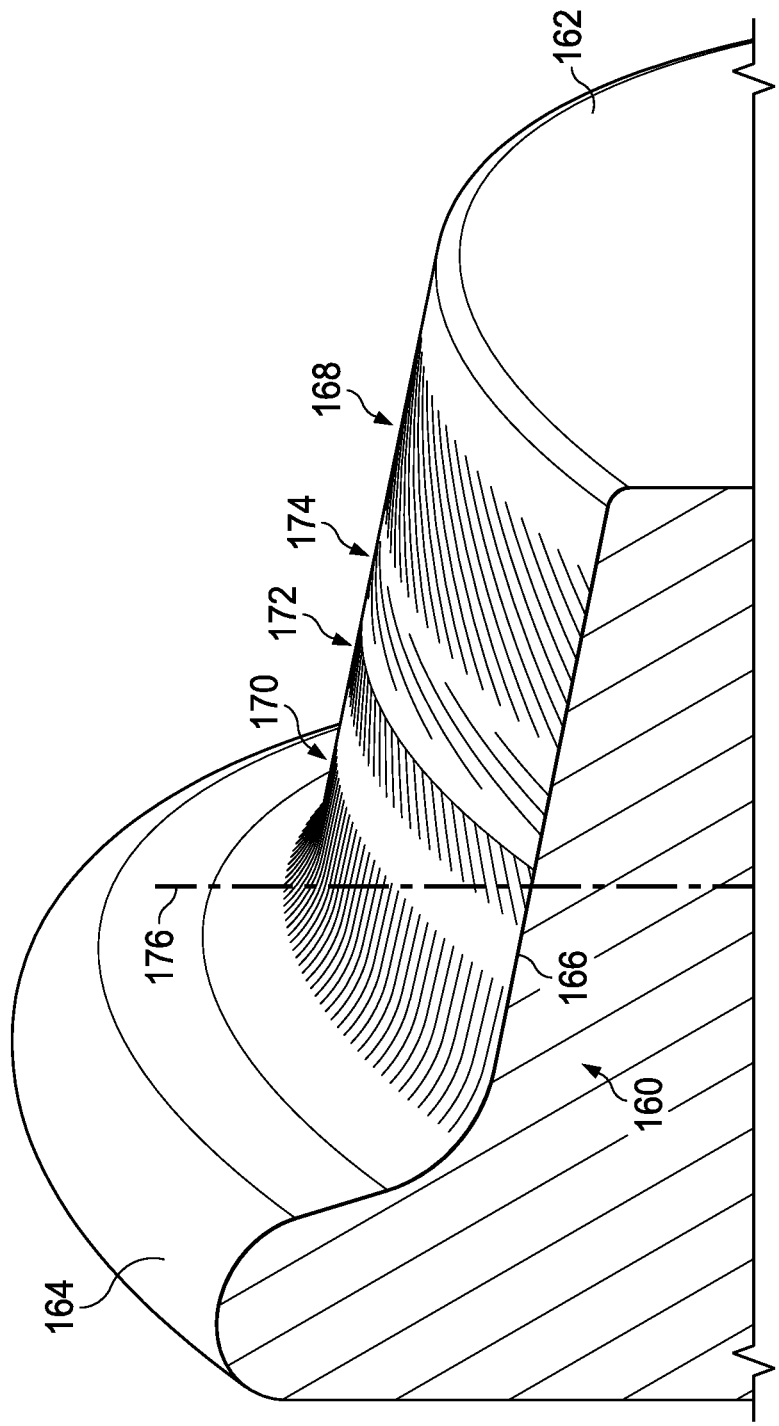
FIG. 5 is a diagram of surface zones of a railroad wheel subject to measurement at a test panel, in accordance with one or more exemplary embodiments of the present disclosure.

FIG. 5 is a cross section diagram of surface zones of a railroad wheel 160 of a wheelset. Wear patterns of the wheel 160 (See FIGS. 7A through 7F following) are subject to measurement at the test panel 10, in accordance with one or more exemplary embodiments of the present disclosure. The wheel 160 includes a field side 162 and a flange 164 on the opposite side of the wheel 160. The tread surface 166 of the wheel is marked in defined zones of wear as follows. Zone 1 (168) is the field side, and zone 2 (170) is the root zone, adjacent to the flange 164. Zone 3 (172) and zone 4 (174), which form the locus of wear of the wheel on a rail under normal conditions, straddle the tape line 176—a centerline of the wheel tread 166—typically to a width of approximately ½ inch either side of the tape line 176.

FIG. 6 is a cross section diagram of a railroad wheel 160 and the test rails of the test panel 10 of FIG. 1. A ballast 20 provides support for the test rails of the track panel 10. As is well known in the art the ballast may include several layers of built-up material such as crushed rock, and the like to provide a firm, stable foundation for cross ties 18 (not shown in FIG. 6 but see, e.g., FIG. 1) that in turn support the test rails. In FIG. 6 the test rails include a primary rail 180 disposed between a secondary rail 182 and a guard rail 188. The primary rail 180 (No. 12 in FIG. 1) is also called the running rail the train normally rides on. The secondary (testing) rail can be milled to a ½" depth, while the running rail can be machined to ⅜" in depth, such that the outside rail can ramp up (moving left to right) as the running rail ramps down, causing the ramps to intersect to create a smooth transition. As shown in FIG. 5, the wear zones of the wheel tread 166 are marked with the numerals 1, 2, 3, and 4.

The secondary rail 182 (No. 116 in FIG. 1) is also called the instrument rail 182 of the track panel 10. The guard rail 188 (No. 14 in FIG. 1), is spaced away from the primary rail 180 to provide clearance for the flange 164 to maintain the alignment of the wheel 160 with the primary rail 180. A guard rail 188 (14 in FIG. 1) is spaced away from the inside edge of both primary rails 180 (12 in FIG. 1). The secondary rail 182 is spaced in close proximity to the primary rail 180 and elevated by a prescribed distance—an elevation increment 190—above the primary rail 180. The elevation increment is provided to elevate the surface of the secondary (instrument) rail 182 just enough to ensure that the wheel 160 being tested is supported by the secondary rail 182 instead of the primary rail 180.

Experimental results indicate that an elevation increment of 0.375 inch is a satisfactory value that allows a sufficient amplitude range to accommodate most wheel defects while holding the elevation increment to a minimum practical value. The elevation increment 190 is preferably reduced gradually toward each end of the secondary rail 182 to provide a smooth transition of the wheel from the primary rail 180 to the secondary rail 182. Also shown in FIG. 6 is the slope or taper formed in the wheel tread 166 set to a 1:20 ratio. The taper is a normal configuration of a railroad wheel that is provided to enable the wheel set to self-steer when going through curved sections of track. The primary rail 180 may have a similar taper or slope to facilitate the self-steering.

Continuing with FIG. 6, the instrument rail 182 includes a sensor 184 attached to the underside of the instrument rail 182 within a clearance space 186 between the instrument rail 182 and the ballast 20. The preferred sensor 184 is a fiber optic element configured as a strain gauge attached to the underside of the instrument rail 182. The fiber optic element in the load sensor 184 can be sensitive to minute displacements of the instrument rail 182 when deflected by a railcar rolling over it. An advantage of fiber optic sensors is that they are immune from effects of electric or electromagnetic fields or interference. The operating principle of a fiberoptic strain gauge is that the optical fiber, which has a Bragg grating structure formed in a segment of the fiber, can be configured to alter the character of a laser light signal traveling in the fiber in proportion to the strain when the fiber optic element is bent due to the load as a railcar wheel rolls along the instrument rail 182. A portion of the light signal may be reflected while a second portion may be transmitted. Thus, the resulting output is a modulated optical signal whose characteristics can be correlated with the differing signatures of various wear patterns, thereby detecting defective and broken wheels.

FIGS. 7A through 7F depict examples of the kinds of defects that may occur in the treads of railway wheels. Each type of defect may be distinguished by their characteristic or distinctive signature, which may be correlated with the wheel impact load data produced by the test panel described herein. Specifically, the output of the sensors attached to the underside of the instrument rails 16 may be correlated with the impact sensed by the fiber optic sensor to provide data regarding the roadworthiness of each wheel of a railway car. The data can be used to enable identification of wheel load impact defects before they might mature sufficiently to cause an accident or derailment. Examples of wheel defects that may be detected include rim breakage, surface or subsurface fatigue, tread cracks, wheel flats, tread indentations, and sliding wear.

Figure 7F:
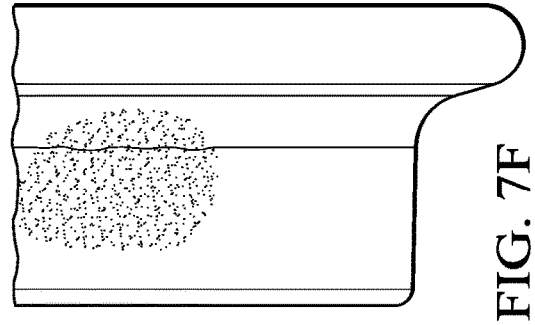
FIG. 7F is an illustration of a sixth example of wheel damage subject to detection by the test panel of FIG. 1, in accordance with one or more exemplary embodiments of the present disclosure.
Figure 7C:
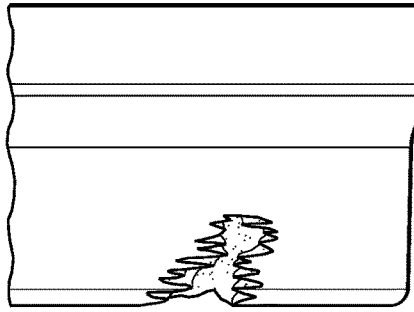
FIG. 7C is an illustration of a third example of wheel damage subject to detection by the test panel of FIG. 1, in accordance with one or more exemplary embodiments of the present disclosure.
Figure 7E:
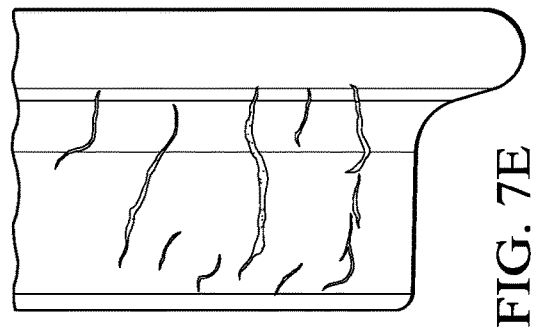
FIG. 7E is an illustration of a fifth example of wheel damage subject to detection by the test panel of FIG. 1, in accordance with one or more exemplary embodiments of the present disclosure.
Figure 7B:
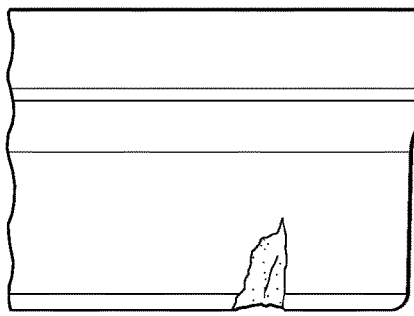
FIG. 7B is an illustration of a second example of wheel damage subject to detection by the test panel of FIG. 1, in accordance with one or more exemplary embodiments of the present disclosure.
Figure 7D:
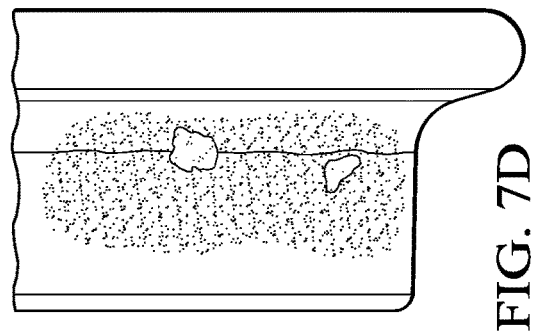
FIG. 7D is an illustration of a fourth example of wheel damage subject to detection by the test panel of FIG. 1, in accordance with one or more exemplary embodiments of the present disclosure.
Figure 7A:
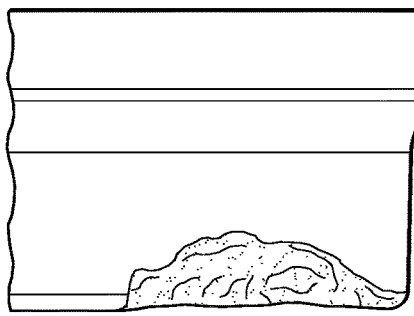
FIG. 7A is an illustration of a first example of wheel damage subject to detection by the test panel of FIG. 1, in accordance with one or more exemplary embodiments of the present disclosure.

FIG. 7A is an illustration of a severe example of wheel damage to the outer edge—zone 1—of a wheel tread that may be the result of cracks or fractures in the wheel tread. This exemplary kind of damage can be detected by the test panel of FIG. 1. In FIG. 7A a substantial amount of the wheel tread surface has broken away, revealing serious subsurface damage to the wheel tread. Such damage tends to occur in zone 1 because the wheel tread thickness is at a minimum in that region. A wheel with that degree of damage must be replaced immediately because a fracture is likely imminent.

FIG. 7B is an illustration of a second example of wheel damage that may be detected by the test panel of FIG. 1. The depicted damage is a short but mature crack to the outer edge 162 (zone 1) of the wheel tread 166 that leaves the wheel tread very vulnerable to further breakdown of the edge of the wheel tread 166, such as depicted in FIG. 7A, and possible wheel fracture.

FIG. 7C is an illustration of a third example of wheel damage subject to detection by the test panel of FIG. 1. This damage is similar to FIG. 7B except that the damage is confined to the surface of the edge portion of zone 1 of the wheel tread 166. Regardless, the wheel set—the assembly of the left and right wheels and the axle connecting them— should be removed so that the wheel tread of the damaged wheel 160 can be restored.

FIG. 7D is an illustration of a fourth example of wheel damage subject to detection by the test panel of FIG. 1. The surface of the wheel tread 166 in zones 2 and 3 is pockmarked due to gravel or other foreign matter caught between the wheel tread 166 and the rail (See rail 12, in FIG. 1) while carrying a load. Also visible is evidence of minor pitting or indentations depicted by the smaller impressions represented by random dots. This type of damage, as long as it is not accompanied by evidence of cracks, is usually benign.

FIG. 7E is an illustration of a fifth example of wheel damage subject to detection by the test panel of FIG. 1. The well-defined cracks in the wheel tread as shown in this figure are the result of heating due to braking followed by rapid cooling. The heating/cooling cycle causes surface tensile stresses that may extend deep into the subsurface of the wheel tread, producing a martensite transformation, leading to the condition generally known as spalling. Spalling appears as fractures in the running surfaces of the wheel tread or flange due to surface or subsurface fatigue brought on by a braked railroad wheel under heavy load sliding along a rail. Such fatigue, through the martensitic transformation leads to cracks, as shown in FIG. 7E, as well as flaking, pitting, or peeling of the surface material of the wheel 160.

FIG. 7F is an illustration of a sixth example of wheel damage subject to detection by the test panel of FIG. 1. This type of damage, that appears as a rectangular pattern on the surface of the wheel tread 166 in zones 2 and 3 is typical of a flat spot caused by a sliding wheel 160 locked by brake action. The sliding action may also result in thermal damage from the sliding friction between the wheel tread 166 and the rail (See rail 12 in FIG. 1). Thermal damage, as discussed above, can result in a martensitic transformation, and which may, in severe cases, cause a loosening of the bond between the wheel tread 166 and its wheel 160.

Briefly stated, the disclosure teaches a railroad wheel impact load detection panel, installed along section of a railroad track having first and second primary rails; a second length of a secondary rail having a first end and a second end disposed proximate the field side of each primary rail of the railroad track such that its running surface is elevated by a predetermined increment relative to the running surface of the primary rail; and a sensor disposed on the bottom surface of each secondary rail at a predetermined location; wherein the secondary rail includes an elevation transition ramp disposed at each first and second end thereof.

In operation, the test panel 10, which may be situated at a wayside along a railway at designated locations such as nearby monitoring or control stations, provides a convenient, automated way to detect wheel damage to rolling stock wheel sets requiring service, restoration, or replacement. The test panel instrumentation measures and interprets the impact loading signals emitted by the sensor attached to the underside of the secondary instrumentation rail 16 disposed alongside the running rail 12. The instrumentation rail 16 is positioned slightly above the running surface of the running rail 12 to bear the load of a passing rail car as it rolls over the test panel 10. A transition region 17 is provided at each end of the test panel 10 to ramp upward and downward respectively thereby enabling the rail car to smoothly enter and depart the test panel 10.

The signals emitted by the sensor, as the rail car rolls along the test panel, are sensitive to the different kinds of wear that railroad wheels develop. The wear patterns, as illustrated in FIGS. 7A-7F, produce distinctive signals or signatures that may be received in the instrumentation modules 62, 64, 66, and interpreted by the instrumentation in the substation 80, and collected to enable scheduling of required service to the wheel sets identified by the test panel 10. The test panel 10 is configured to detect wheel damage that occurs in both the wheel tread (zones 3 and 4 in FIG. 6) and the outer (field side) edge 162 of the wheel (zone 1 in FIG. 6). As configured, the test panel 10 is particularly effective in detecting zone 1 damage, where the most severe damage is likely to occur.

While the disclosure may have been shown in only one of its forms, it is not limited to that one form but is susceptible to various changes and modifications without departing from the concepts and principles set forth in the enumerated claims. For example, while the embodiments described herein illustrate one combination of structural elements, other equivalent combinations are contemplated within the scope of the claims. Alternative structural features may include different types of strain gauges that satisfy the sensitivity requirements. The dimensions of the track test panel such as the spacing of rails, elevation, taper, and transition slope are permitted as long as the combination serves the purposes of the track test panel. The specific form of the instrumentation, including computer processing elements and the associated software, data correlations, and algorithms needed for their operation is understood to be adapted to the particular circumstances of the railroad wheel impact load detection protocols.

Persons skilled in the art will readily understand that these advantages (as well as the advantages indicated in the summary) and objectives of this system would not be possible without the particular combination of computer hardware, control logic, and other structural components and mechanisms assembled in this inventive system and described herein. It will be further understood that a variety of programming tools, known to persons skilled in the art, are available for implementing the control of the features and operations described in the foregoing disclosure. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the present disclosure should be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A railroad wheel impact load detection test panel, comprising:
   a section of a railroad track having first and second primary rails;
   a first secondary rail and a second secondary rail, each having a first end and a second end and disposed proximate a field side of each primary rail of the railroad track such that its running surface is elevated by a predetermined increment relative to the running surface of the primary rail, wherein the field side is an opposite side from a flange of a railroad wheel; and
   a sensor disposed on the bottom surface of each secondary rail at a predetermined location; wherein
   the secondary rail includes an elevation transition ramp disposed at each first and second end thereof.

2. The detection test panel of claim 1, wherein:
   the first and second primary rails are spaced a defined gauge distance apart and supported on a ballast composition constructed on the Earth's surface; wherein
   the section of railroad track is a selected portion of track disposed on a railroad right of way.

3. The detection test panel of claim 1, wherein each first and second secondary rail comprises:
   a predetermined length of rail supported proximate each primary rail such that its running surface is disposed by an elevation of 0.250 to 0.500 inches above the elevation of the proximate primary rail; and
   each first and second end of each secondary rail is tapered downward such that the elevation at each first and second end thereof is equal to the elevation of the proximate primary rail; wherein
   the predetermined length of the first and second secondary rails is at least 80 feet.

4. The detection test panel of claim 3, wherein the elevation of each secondary rail is approximately 0.375 inch.

5. The detection test panel of claim 1, wherein the sensor comprises:
   an optical strain gauge having a fiber optic sensing element housed in a weather-resistant container; and
   an integral connector for coupling the optical strain gauge to external instrumentation; wherein
   the sensing element has a sensitivity corresponding to a resolution of no greater than a one thousand pound (one kip) load on the first and second secondary rails.

6. The detection test panel of claim 5, wherein the external instrumentation comprises:
   a housing supported on a tower along a wayside of the railroad track;
   a processing system housed in the housing and connected through a cable to the integral connector; wherein
   the processing system is controlled by program software stored in non-volatile memory coupled to the processing system.

7. The detection test panel of claim 1, wherein further comprising:
   a first and second guard rail disposed along each primary rail and spaced a defined distance inward from each primary rail; wherein
   the defined distance is sufficient to allow free passage of a standard railroad wheel flange.

8. The detection test panel of claim 1, wherein the sensor provides an output comprising:
   a distinctive signature of wheel tread defects indicating one or more of rim breakage, surface or subsurface fatigue, tread cracks, wheel flats, tread indentations, and sliding wear.

9. A railroad wheel impact load detection test panel, comprising:
   a section of a railroad track having first and second primary rails;
   at least one secondary rail, having a first end and a second end and disposed proximate a field side of either primary rail of the railroad track such that its running surface is elevated by a predetermined increment relative to the running surface of the primary rail, wherein the field side is an opposite side from a flange of a railroad wheel; and
   a sensor disposed on the bottom surface of the at least one secondary rail at a predetermined location; wherein
   the at least one secondary rail includes an elevation transition ramp disposed at each first and second end thereof.

10. The detection test panel of claim 9, wherein:
    the first and second primary rails are spaced a defined gauge distance apart and supported on a ballast composition constructed on the Earth's surface; wherein
    the section of railroad track is a selected portion of track disposed on a railroad right of way.

11. The detection test panel of claim 9, wherein the at least one secondary rail comprises:
    a predetermined length of rail supported proximate an associated primary rail such that its running surface is disposed by an elevation of 0.250 to 0.500 inches above the elevation of the proximate primary rail; and each first and second end of each secondary rail is tapered downward such that the elevation at each first and second end thereof is equal to the elevation of the proximate primary rail; wherein the predetermined length of the first and second secondary rails is at least 80 feet.

12. The detection test panel of claim 9, wherein the elevation of each secondary rail is approximately 0.375 inch.

13. The detection test panel of claim 9, wherein the sensor comprises:

an optical strain gauge having a fiber optic sensing element housed in a weather-resistant container; and an integral connector for coupling the optical strain gauge to external instrumentation; wherein the sensing element has a sensitivity corresponding to a resolution of no greater than a one thousand pound (one kip) load on the at least one secondary rail.

14. The detection test panel of claim 13, wherein the external instrumentation comprises:

a housing supported on a tower along a wayside of the railroad track;

a processing system housed in the housing and connected through a cable to the integral connector; wherein the processing system is controlled by program software stored in non-volatile memory coupled to the processing system.

15. The detection test panel of claim 9, wherein further comprising:

a first and second guard rail disposed along each primary rail and spaced a defined distance inward from each primary rail; wherein the defined distance is sufficient to allow free passage of a standard railroad wheel flange.

16. The detection test panel of claim 9, wherein the sensor provides an output comprising:

a distinctive signature of wheel tread defects indicating one or more of rim breakage, surface or subsurface fatigue, tread cracks, wheel flats, tread indentations, and sliding wear.

* * * * *